(12) United States Patent
Osaka

(10) Patent No.: US 7,212,415 B2
(45) Date of Patent: May 1, 2007

(54) RESONANCE TYPE SWITCHING POWER SOURCE

(75) Inventor: Syohei Osaka, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 318 days.

(21) Appl. No.: 11/037,848

(22) Filed: Jan. 18, 2005

(65) Prior Publication Data

US 2005/0157522 A1 Jul. 21, 2005

(30) Foreign Application Priority Data

Jan. 19, 2004 (JP) ............................ P2004-011226

(51) Int. Cl.
*H02M 3/335* (2006.01)
(52) U.S. Cl. ................ 363/21.02; 363/21.1; 363/21.18
(58) Field of Classification Search .................. 363/16, 363/21.02, 21.03, 21.04, 21.1, 21.18, 95, 363/97
See application file for complete search history.

(56) References Cited

U.S. PATENT DOCUMENTS

| | | | | |
|---|---|---|---|---|
| 5,712,772 | A * | 1/1998 | Telefus et al. ........... | 363/21.02 |
| 6,320,765 | B2 * | 11/2001 | Yasumura ................. | 363/21.02 |
| 6,362,984 | B2 * | 3/2002 | Gekinozu ................. | 363/97 |
| 6,483,721 | B2 * | 11/2002 | Terashi .................... | 363/17 |
| 6,654,259 | B2 * | 11/2003 | Koshita et al. ........... | 363/21.03 |
| 6,788,556 | B2 * | 9/2004 | Hosotani et al. ......... | 363/21.15 |
| 6,839,245 | B2 * | 1/2005 | Yasumura ................. | 363/21.02 |
| 6,934,167 | B2 * | 8/2005 | Jang et al. ................ | 363/21.02 |
| 7,116,561 | B2 * | 10/2006 | Osaka ...................... | 363/21.02 |

FOREIGN PATENT DOCUMENTS

| JP | 11-332232 | * 11/1999 |
|---|---|---|
| JP | 2002-171755 | * 6/2002 |

* cited by examiner

*Primary Examiner*—Jeffrey Sterrett
(74) *Attorney, Agent, or Firm*—Bachman & LaPointe, P.C.

(57) ABSTRACT

A control circuit 6 of a resonance type switching power source comprises a drive circuit 21 for supplying drive pulses to each gate terminal of first and second MOS-FETs 2,3; a PWM circuit 9 for causing drive circuit 21 to produce drive pulses; an input voltage detector 7 for detecting input voltage from DC power source 1 and comparing the input voltage and input reference voltage $V_{ref1}$; and a frequency adjuster 8 for adjusting oscillation frequency of PWM circuit 9 in response to output level from the input voltage detector 7. With adjustment in oscillation frequency of PWM circuit 9 in response to input voltage $V_{in}$ from DC power source 1, control circuit 6 can modify on-off timing of first and second MOS-FETs 2, 3 to keep good resonating action and prevent off-resonance although DC power source 1 produces fluctuating input voltages.

9 Claims, 4 Drawing Sheets

PRIOR ART

RESONANCE TYPE SWITCHING POWER SOURCE

TECHNICAL FIELD

This invention relates to a resonance type switching power source, in particular, of the type capable of preventing off-resonance for good resonance action under a large fluctuation of input voltage.

BACKGROUND OF THE INVENTION

FIG. 11 shows an electric circuit diagram of a prior art resonance type switching power source. This power source comprises a DC power source 1 such as a battery or rectifier circuit of capacitor-input type; a transformer 4 having primary and secondary windings 22, 23; first and second switching elements 2, 3 such as MOS-FETs connected in series to both electrodes of DC power source 1; a series circuit of primary winding 22 of transformer 4 and a current resonance capacitor 15 connected in parallel to first switching element 2 and in series to second switching element 3; a rectifying and smoothing circuit 5 which comprises a rectifying diode 16 and a smoothing capacitor 17 connected to secondary winding 23 of transformer 4; an electric load 10 connected in parallel to smoothing capacitor 17; and a control circuit 20 for producing drive pulses to first and second switching elements 2, 3. The power source also includes first and second parasitic diodes 12, 13 connected in parallel respectively to first and second switching elements 2, 3; and a capacitor 14 connected in parallel to first switching element 2. Control circuit 20 produces outputs to alternately turn on and off first and second switching elements 2, 3 so that electric current flows through primary winding 22 to electrically resonate current resonance capacitor 15 and primary winding 22 when second switching element 3 is turned on while DC power is supplied from secondary winding 23 of transformer 4 through rectifying and smoothing circuit 5 to load 10. When first switching element 2 is tuned off, a closed circuit is formed which involves first switching element 2, primary winding 22 and current resonance capacitor 15. Transformer 4 is a leakage transformer with leakage inductance to form a resonance reactor (not shown) connected in series to primary winding 22.

The power source shown in FIG. 11 also comprises an output voltage detector 11 connected to rectifying and smoothing circuit 5 for detecting output voltages from secondary winding 23, comparing the output voltage with an output reference voltage (not shown), and controlling pulse width of drive pulse signals from control circuit 6 in response to the compared result. Control circuit 20 comprises a drive circuit 21 for supplying drive pulses to each control terminal of first and second switching elements 2, 3; and a PWM circuit 9 for causing drive circuit 21 to produce the drive pulses. Output voltage detector 11 detects the output voltage $V_o$ to load 10 to provide PWM circuit 9 with detection signals so that PWM circuit 9 varies time width of the pulses to drive circuit 21 which thereby alternately turns on and off first and second switching elements 2 and 3 by supplying each control or gate terminal of first and second switching elements 2 and 3 with first and second drive pulse signals in response to the output voltage $V_o$. As shown in FIG. 11, output voltage detector 11 transports the detection signals to an input terminal of PWM circuit 9 through a photo-coupler of photo-diode 18 and photo-transistor 19.

In operation, control circuit 20 provides each gate terminal of first and second switching elements 2, 3 with first and second drive pulse signals of opposite phase to alternately turn them on and off so that resonance current of substantially sinusoidal waveform flows through primary winding 22 of transformer 4 under resonance action of leakage inductance in transformer 4 and current resonance capacitor 15. Electric current through primary winding 22 produces across secondary winding 23 an inductive voltage which is supplied to load 10 as DC output voltage $V_o$ through rectifying and smoothing circuit 5 of rectifying diode 16 and smoothing capacitor 17. When DC output voltage $V_o$ is higher, a large amount of electric current flows through photo-diode 18, and therefore, photo-transistor 19 receives a larger amount of light from photo-diode 18 so that PWM circuit 9 serves to produce drive pulses of shorter time width to first and second switching elements 2, 3 with the higher DC output voltage $V_o$. Adversely, when DC output voltage $V_o$ is lower, a small amount of electric current flows through photo-diode 18 so that photo-transistor 19 receives a smaller amount of light from photo-diode 18. Accordingly, PWM circuit 9 serves to produce drive pulses of wider time width to first and second switching elements 2, 3. In this way, PWM circuit 9 adjusts the time width or "on width" of drive pulses to first and second switching elements 2, 3 in response to voltage level of DC output to thereby stabilize DC output voltage $V_o$ to load 10.

In the power source shown in FIG. 11, current on switching rises with the substantially sinusoidal wave form as zero-current switching when first or second switching element 1 or 2 is turned on. Also, voltage on switching rises with the gentle wave form as zero-voltage switching when first or second switching element 1 or 2 is turned off. Zero-current and zero-voltage switching results in reduction of switching loss upon on or off operation of first and second switching element 2, 3. Prior art resonance type switching power sources of similar type are for example shown by Japanese Patent Disclosure No. 11-332232 published Nov. 30, 1999 and Japanese Patent Disclosure No. 2002-171755 published Jun. 14, 2002.

As mentioned-above, prior art resonance type switching power sources utilize series resonance action by reactance component and resonance capacitance of transformer to accomplish zero-current switching, reduction of noise and high efficiency for the power sources. Such control technique is preferably applicable with less change in input voltage, for example, with a narrow range of input voltage such as only 100 volts or only 200 volts or otherwise under PWM control with locked oscillation frequency. However, if input voltage varies in a wide range from 100 to 200 volts, time ratio or duty ratio λ for PWM control steeply changes without change in resonance frequency, but disadvantageously coincidentally producing off-resonance in transformer or interruption of current flow through secondary winding in transformer which results in drop of output voltage or considerable increase of noise.

An object of the present invention is to provide a resonance type switching power source capable of producing a stable output voltage under wider variation of input voltage applied to the power source.

SUMMARY OF THE INVENTION

The resonance type switching power source according to the present invention, comprises a DC power source (1); a transformer (4) having primary and secondary windings (22, 23); at least first and second switching elements (2,3)

connected in series to both electrodes of the DC power source (1); a current resonance capacitor (15) connected in parallel to the first switching element (2) and in series to the primary winding (22) of the transformer (4) and second switching element (3); a rectifying and smoothing circuit (5) connected to the second winding (23) of the transformer (4); and a control circuit (6) for producing drive pulses to the first and second switching elements (2,3) to alternately turn on and off the switching elements (2,3). A closed circuit is formed by the first switching element (2), primary winding (22) and current resonance capacitor (15) when the first switching element (2) is turned off. The control circuit (6) comprises a drive circuit (21) for supplying drive pulses to each control terminal of the first and second switching elements (2,3); a PWM circuit (9) for causing the drive circuit (21) to produce the drive pulses; an input voltage detector (7) for detecting input voltage from the DC power source (1) and comparing the input voltage and input reference voltage ($V_{ref1}$); and a frequency adjuster (8) for adjusting the oscillation frequency of the PWM circuit (9) in response to an output level from the input voltage detector (7). When the second switching element (3) is turned on, electric current flows through the primary winding (22) to electrically resonate the current resonance capacitor (15) and primary winding (22), while DC power is supplied from the secondary winding (23) of the transformer (4) through the rectifying and smoothing circuit (5) to a load (10). The control circuit (6) can regulate the oscillation frequency of the PWM circuit (9) in response to varied input voltage ($V_{in}$) from the DC power source (1) by operations of the input voltage detector (7) and frequency adjuster (8). Accordingly, although the DC power source (1) produces the fluctuating input voltage ($V_{in}$), the control circuit (6) can adjust the PWM circuit (9) to the optimum oscillation frequency by controlling oscillation frequency of the frequency adjuster (8). Thus, the control circuit (6) can modify the on-off timing of first and second switching elements (2, 3) to keep resonance, prevent off-resonance of the transformer (4) and produce the stable output voltage with repression of increase in noise.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Embodiments of the resonance type switching power source according to the present invention are described hereinafter in connection with FIGS. 1 to 10 wherein same symbols are applied to denote similar elements shown in FIGS. 1, 10 and 11.

Figure 1:
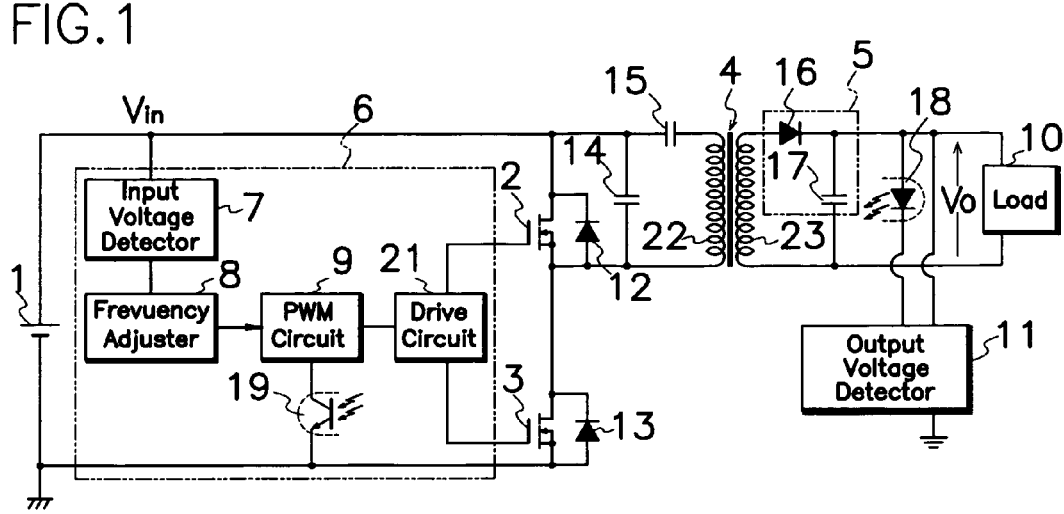
FIG. 1 is an electric circuit diagram of an embodiment of the resonance type switching power source according to the present invention.
Figure 11:
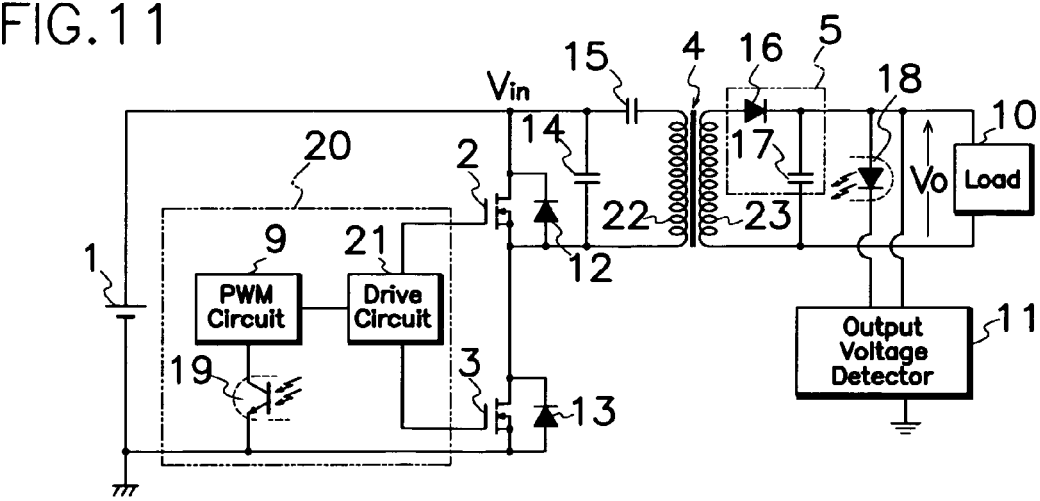
FIG. 11 is an electric circuit of a prior art resonance type switching power source.

In an embodiment of the present invention shown in FIG. 1, the resonance type switching power source comprises a control circuit 6 which includes an input voltage detector 7 for detecting input voltage from DC power source 1 to produce detection signals; and a frequency adjuster 8 for adjusting the oscillation frequency of PWM circuit 9 in response to outputs from the input voltage detector 7 unlike prior art resonance type switching power source shown in FIG. 11. Input voltage detector 7 detects input voltage from DC power source 1 and compares input voltage and input reference voltage $V_{ref1}$, and frequency adjuster 8 modifies oscillation frequency of PWM circuit 9 in response to output level from input voltage detector 7.

Figure 2:
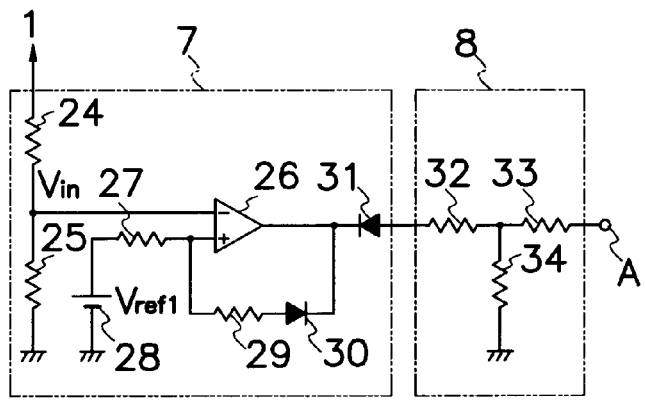
FIG. 2 is a circuit diagram of an input voltage detector and a frequency adjuster connected thereto in a control circuit shown in FIG. 1.

As shown in FIG. 2, input voltage detector 7 comprises a potential divider of two resistors 24, 25 connected in series; a comparator 26 having an inverted input terminal connected between two resistors 24, 25 for receiving input voltage $V_{in}$; a first reference power source 28 for producing a reference voltage $V_{ref1}$ to non-inverted input terminal of comparator 26 through a resistor 27; a rectifying diode 31 of a cathode terminal connected to comparator 26; and a series circuit of a resistor 29 and diode 30 connected between a junction of comparator 26 and diode 31 and non-inverted input terminal of comparator 26. One end of resistors 24, 25 is connected to DC power source 1, and the other end of resistors 24, 25 is grounded. Frequency adjuster 8 comprises first and second resistors 32 and 33; and a third resistor 34 connected between ground and a junction of first and second resistors 32 and 33 to change the frequency of PWM circuit 9. First resistor 32 is connected to an anode terminal of rectifying diode 31, and second resistor 33 is connected to an input terminal of PWM circuit 9.

When input voltage $V_{in}$ divided by potential divider is lower than input reference voltage $V_{ref1}$, comparator 26 of input voltage detector 7 shown in FIG. 2 produces an output of higher voltage, and therefore, frequency adjuster 8 produces to the output terminal, i.e. an input control terminal A an output of the voltage level determined by an electric current through a combined resistance of second and third resistors 33 and 34. On the contrary, when input voltage $V_{in}$ is elevated above input reference voltage $V_{ref1}$, comparator 26 produces the output of lower voltage, and therefore, frequency adjuster 8 produces to input control terminal A an output of the voltage level determined by electric currents of two kinds, firstly through combined resistance of first and second resistors 32 and 33, and secondly through combined resistance of second and third resistors 33 and 34. In other words, outputs of higher and lower voltages produced from comparator 26 change the values of combined resistance of first, second and third resistors 32, 33 and 34.

Figure 3:
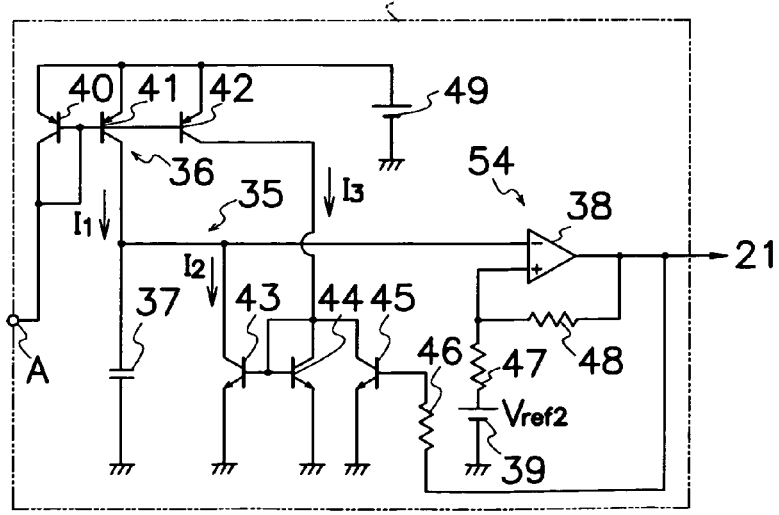
FIG. 3 is a circuit diagram of a PWM circuit in the control circuit shown in FIG. 1.

As shown in FIG. 3, PWM circuit 9 comprises a current regulator 36 connected to a regulation DC power source 49; an oscillation circuit 35 connected to current regulator 36; and a comparative circuit 54 for examining a level of the output from oscillation circuit 35. Current regulator 36 comprises first, second and third PNP transistors 40, 41 and 42. First PNP transistor 40 comprises an emitter terminal connected to a DC power source 49, a collector terminal connected to control terminal A, and a base terminal. Second PNP transistor 41 serves to form a first current mirror circuit in cooperation with first PNP transistor 40 and has a collector terminal connected to oscillation circuit 35. Third PNP transistor 42 comprises a base terminal connected to each base terminal of first and second PNP transistors 40 and 41 and an emitter terminal connected to power source 49. In this embodiment, second PNP transistor 41 provides a charging current source for passing charging electric current $I_1$ through second PNP transistor 41 to charge regulation capacitor 37; third PNP transistor 42 provides a discharging current source for passing discharging electric current $I_2$ to discharge regulation capacitor 37; and control terminal A is one for setting frequency.

An oscillation circuit 35 comprises a regulation capacitor 37 connected collector terminal of second PNP transistor 41 and ground to charge regulation capacitor 37 by electric current supplied from current regulator 36; and a second current mirror circuit connected to current regulator 36 and regulation capacitor 37. Second current mirror circuit comprises first, second and third NPN transistors 43, 44 and 45. First NPN transistor 43 comprises a collector terminal connected to regulation capacitor 37 and collector terminal of second PNP transistor 41, and emitter terminal connected to ground. Second NPN transistor 44 provides second current mirror circuit in cooperation with first NPN transistor 43. Third NPN transistor 45 comprises a collector terminal connected to a junction of each base terminal of first and second NPN transistors 43 and 44 and collector terminal of second NPN transistor 44, and emitter terminal connected to ground. Comparative circuit 54 comprises a second reference power source 39 for producing a reference voltage $V_{ref2}$ for chopping waves; a comparator 38 which has an inverted input terminal connected to regulation capacitor 37 and collector terminal of first NPN transistor 43 and a non-inverted input terminal connected to power source 39 through a resistor 47; and a resistor 48 connected between an output terminal and non-inverted input terminal of comparator 38. A base terminal of third NPN transistor 45 is connected to output terminal of comparator 38 through a resistor 46.

Figure 4:
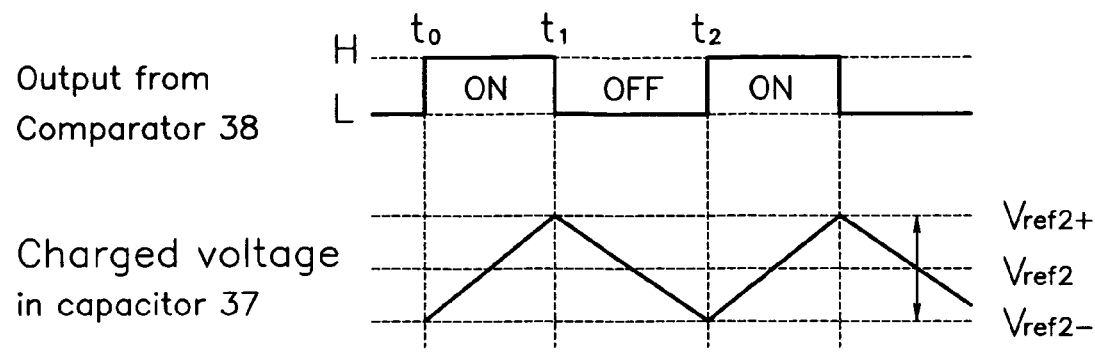
FIG. 4 is a waveform diagram during operation of the PWM circuit.
Figure 5:
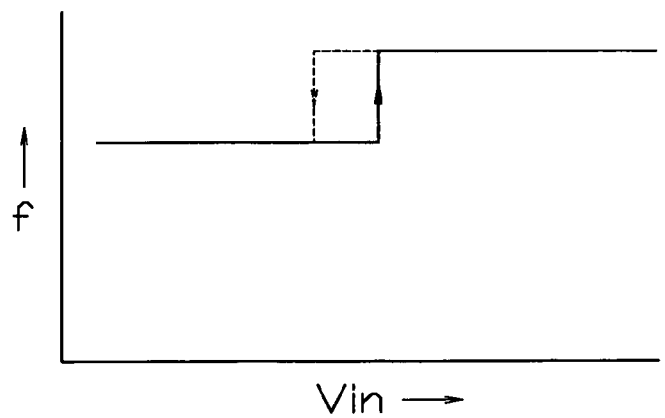
FIG. 5 is a graph indicating the relationship between input voltage applied on the circuit shown in FIG. 2 and oscillation frequency of the PWM circuit.

In operation, electric current $I_1$ flows through second PNP transistor 41 of current regulator 36 to charge regulation capacitor 37 with the value of electric current $I_1$ being proportional to the value of electric current flowing through current regulator 36 to control electric current through control terminal A. Accordingly, as shown in FIG. 4, regulation capacitor 37 is charged by electric current $I_1$ during a period of time between points $t_0$ and $t_1$ to linearly increase charged voltage on regulation capacitor 37. At the moment, as comparator 38 produces higher voltage output, third NPN transistor 45 is turned on, and first NPN transistor 43 is turned off to shut off electric current $I_2$ through first NPN transistor 43. When charged voltage on regulation capacitor 37 reaches reference voltage $V_{ref2}$ of power source 39, comparator 38 produces lower level output to turn off third NPN transistor 45. Accordingly, electric current $I_3$ flows from third PNP transistor 42 through second NPN transistor 44 to grand, and at the same time, electric current $I_2$, that is twice electric current $I_3$ flows through first NPN transistor 43 of second current mirror circuit. In this case, if comparator 38 has the hysteretic characteristics as shown in FIG. 5, comparator 38 produces the output when charged voltage on regulation capacitor 37 actually reaches an upper limit $V_{ref2+}$ of the hysteresis. Therefore, electric current $I_1$ flows into regulation capacitor 37 to increase charged voltage on regulation capacitor 37 until point $t_1$, however, regulation capacitor 37 is discharged during a period of time between points $t_1$ and $t_2$ to decrease charged voltage because electric current supplied to regulation capacitor 37 becomes $I_1 - I_2 = -I_1$ after point $t_1$. Subsequently, when charged voltage on regulation capacitor 37 is reduced to $V_{ref2-}$, comparator 38 converts the output to higher voltage to again turn on third NPN transistor 45. Thus, electric current $I_3$ does not flow through second NPN transistor 44 to again charge regulation capacitor 37. The value of electric current for charging and discharging regulation capacitor 37 is equal to or proportional to the value of electric current through control terminal A because first and second PNP transistors 40 and 41 form the first current mirror circuit. Then, the value of electric current through control terminal A can be adjusted by varying the combined resistance value of frequency adjuster 8 connected between control terminal A of PWM circuit 9 and input voltage detector 7. Accordingly, oscillation frequency of PWM circuit 9 can be adjusted by modifying combined resistance values of frequency adjuster 8 in response to output level of input voltage detector 7, to thereby control charging current $I_1$ and discharging current $I_2$ for regulation capacitor 37 which produces consecutively oscillating waveform (chopping waveform or serrate waveform) from oscillation circuit 35 upon repeated charge and discharge of regulation capacitor 37.

Figure 6:
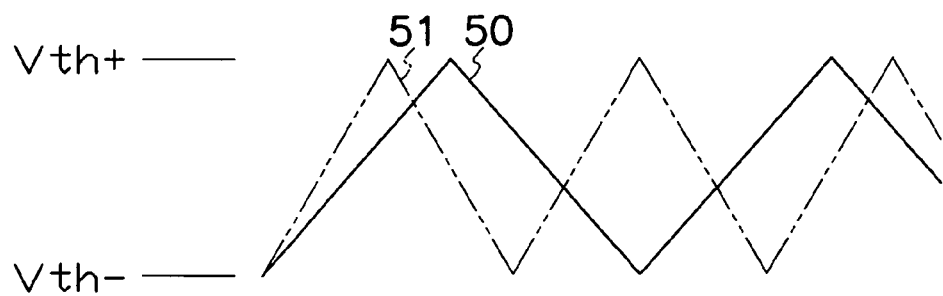
FIG. 6 shows chopping waves generated from an oscillation circuit.

FIG. 5 is a graph showing a step-functional variation in oscillation frequency f of oscillation circuit 35 relative to variation in input voltage $V_{in}$ applied on inverted input terminal of comparator 26. As mentioned above, combined resistance value of frequency adjuster 8 serves to determine the value of charging and discharging current for regulation capacitor 37 in oscillation circuit 35 of PWM circuit 9. In the embodiment shown in FIGS. 2 and 3, when input voltage detector 7 detects input voltage $V_{in}$ is higher, combined resistance value of frequency adjuster 8 becomes lower to thereby cause increased electric current to flow into regulation capacitor 37. Accordingly, as shown in FIG. 6, chopping wave generated from oscillation circuit 35 of PWM circuit 9 becomes a ramp or triangular wave 51 of sharp acumination or steep inclination angle to increase oscillation frequency f of PWM circuit 9. Adversely, when input voltage detector 7 detects input voltage $V_{in}$ is lower, combined resistance value of frequency adjuster 8 becomes higher to thereby cause decreased electric current to flow into regulation capacitor 37. Accordingly, chopping wave generated from oscillation circuit 35 of PWM circuit 9 becomes a triangular wave 50 of obtuse acumination or gentler inclination angle to reduce oscillation frequency f of PWM circuit 9. In this way, frequency adjuster 8 outputs command signals to oscillation circuit 35 of PWM circuit 9 to increase oscillation frequency when input voltage $V_{in}$ is equal to or over input reference voltage $V_{ref1}$, or decrease oscillation frequency when input voltage $V_{in}$ is below input reference voltage $V_{ref1}$. Also, preferably frequency adjuster 8 may have the hysteretic characteristics of frequency for input voltage.

As mentioned above, control circuit 6 can modify oscillation frequency of PWM circuit 9 in response to varied input voltage $V_{in}$ from DC power source 1 to adequately adjust on-off timing of first and second switching elements 2 and 3. This enables to regulate operation of PWM circuit 9 for appropriate oscillation frequency to prevent off-resonance of transformer 4 keeping good resonance in PWM circuit 9. Also, in prior art power sources, control circuits must enlarge the range of pulse width modulation for drive pulse signals output from control circuits when input voltage $V_{in}$ changes in a wider range, however, the present invention can regulate oscillation frequency of PWM circuit 9 to preferably control on-off timing of first and second switching elements 2 and 3 without enlarging the range of pulse width modulation.

Figure 7:
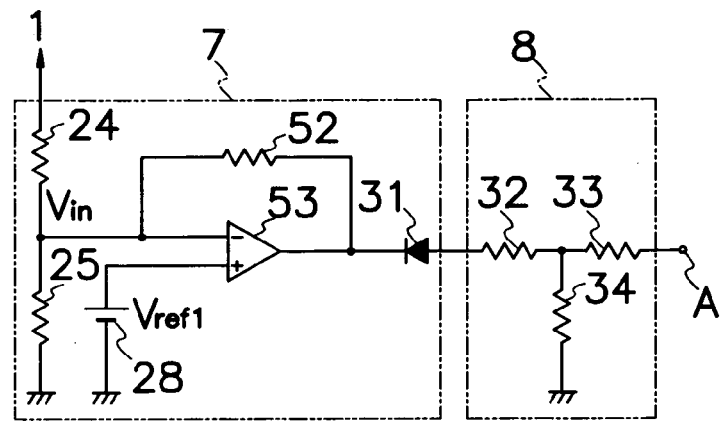
FIG. 7 is an electric circuit of another embodiment of the input voltage detector.
Figure 8:
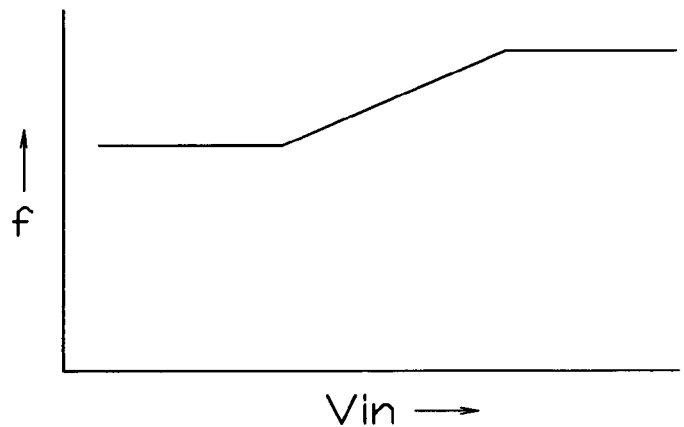
FIG. 8 is a graph indicating the relationship between input voltage of the circuit shown in FIG. 7 and oscillation frequency of the PWM circuit.

FIG. 7 illustrates a modified embodiment of input voltage detector 7 shown in FIG. 2. Input voltage detector 7 exhibited in FIG. 7 comprises a power source 28 for generating input reference voltage $V_{ref1}$; two resistors 24 and 25 connected in series to each other for detecting a divided input voltage $V_{in}$; an operational amplifier 53 which has an inverted input terminal connected between two resistors 24 and 25 and a non-inverted input terminal connected to power source 28; a rectifying diode 31 of a cathode terminal connected to an output terminal of operational amplifier 53; and a feedback resistor 52 connected between output terminal and inverted input terminal of operational amplifier 53. Similarly to input voltage detector 7 shown in FIG. 2, an anode terminal of rectifying diode 31 is connected to an end of first and second resistors 32 and 33 of frequency adjuster 8 for modification of frequency.

Figure 9:
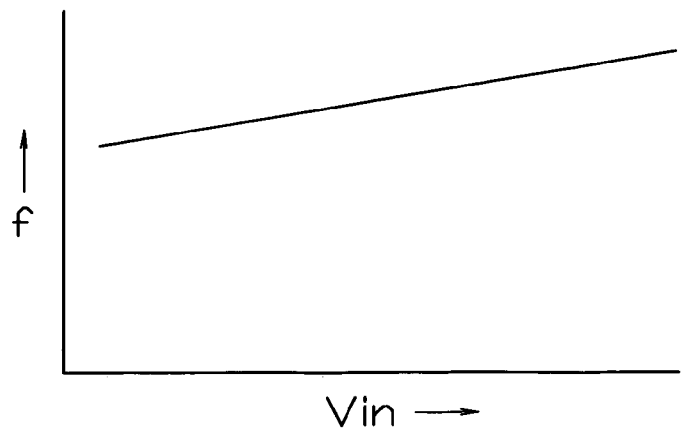
FIG. 9 is another graph indicating the relationship between input voltage of the circuit shown in FIG. 7 and oscillation frequency of the PWM circuit.

In the embodiment shown in FIG. 7, combined resistance of frequency adjuster 8 is varied to approach a combined resistance value of second and third resistor 33 and 34 for frequency modulation when output voltage of operational amplifier 53 is higher than input reference voltage $V_{ref1}$. Adversely, when output voltage of operational amplifier 53 is lower than input reference voltage $V_{ref1}$, combined resistance of frequency adjuster 8 is varied to approach a combined resistance value of first, second and third resistors 32, 33 and 34. In other words, like in the embodiment shown in FIG. 2, when input voltage detector 7 detects higher input voltage $V_{in}$, combined resistance value of frequency adjuster 8 becomes lower so that oscillation circuit 35 generates sharp triangular wave 51 shown in FIG. 6 to elevate oscillation frequency of PWM circuit 9. Moreover, the circuit shown in FIG. 7 or other circuits may partially vary oscillation frequency f of oscillation circuit 35 with input voltage $V_{in}$ in a continuously linear-functional fashion shown in FIG. 8 wherein input voltage detector 7 and frequency adjuster 8 can change oscillation frequency between upper and lower limits. Alternatively, frequency adjuster 8 may be designed to change the whole oscillation frequency in a simply continuously linear-functional fashion in proportion to input voltage $V_{in}$ as shown in FIG. 9. Otherwise, frequency adjuster 8 may change oscillation frequency in accordance with a desired or optional function of input voltage $V_{in}$.

Figure 10:
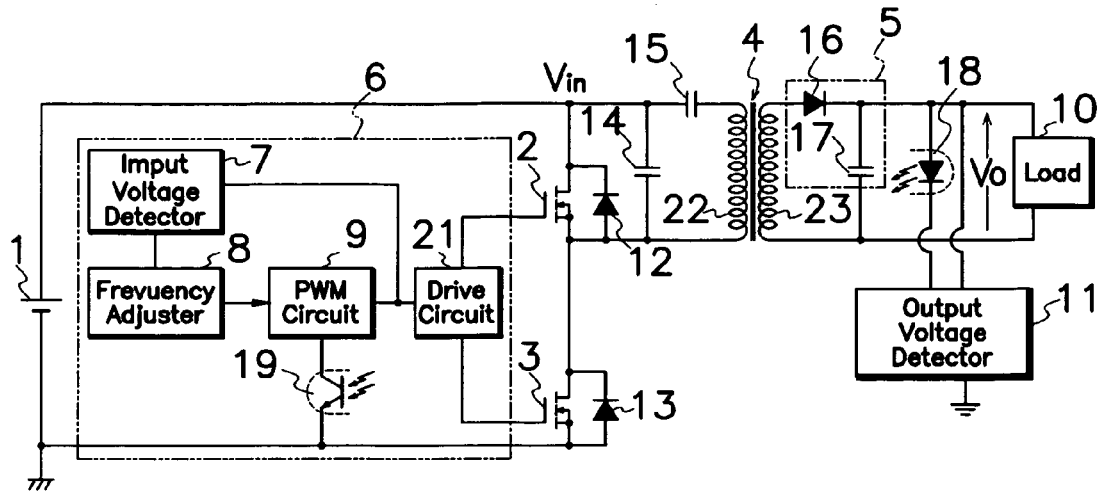
FIG. 10 is an electric circuit of another embodiment of the resonance type switching power source according to the present invention.

Other embodiments in further different modes of the present invention may be carried out without limitation to the embodiments shown in FIGS. 1 to 10, and they can contain all alterations coming under the scope of the claims. For example, the foregoing embodiments exemplifies adjustment of oscillation frequency by changing the composite resistance value to vary the amount of electric current for charging and discharging regulation capacitor 37 of PWM circuit 9, instead, input voltage detector 37 may switch regulation capacitor 37 of PWM circuit 9 to another compensatory capacitor of different capacitance to vary the amount of charging and discharging electric current for the compensatory capacitor. Also, as shown in FIG. 10, input voltage detector 7 may detect pulse signals from PWM circuit 9 to drive circuit 21 to vary oscillation frequency of PWM circuit 9 in response to the pulse signals detected by input voltage detector 7 without directly detecting input voltage $V_{in}$.

The resonance type switching power source of the present invention is available for information, electric or electronic devices, instruments and apparatus such as personal computers, uninterruptible power supplies (UPS) or the like in wider electrically and electronically controlled fields.

What is claimed is:

1. A resonance type switching power source comprising a DC power source; a transformer having primary and secondary windings; at least first and second switching elements connected in series to both electrodes of said DC power source; a current resonance capacitor connected in parallel to said first switching element and in series to the primary winding of said transformer and second switching element; a rectifying and smoothing circuit connected to the second winding of said transformer; and a control circuit for producing drive pulses to said first and second switching elements to alternately turn on and off the switching elements;

a closed circuit being formed by the first switching element, primary winding and current resonance capacitor when the first switching element is turned off, said control circuit comprising a drive circuit for supplying drive pulses to each control terminal of the first and second switching elements; a PWM circuit for causing the drive circuit to produce the drive pulses; an input voltage detector for detecting input voltage from the DC power source and comparing the input voltage and input reference voltage; and a frequency adjuster for adjusting the oscillation frequency of the PWM circuit in response to an output level from the input voltage detector;

wherein, when the second switching element is turned on, electric current flows through the primary winding to electrically resonate the current resonance capacitor and primary winding, while DC power is supplied from the secondary winding of the transformer through the rectifying and smoothing circuit to a load.

2. The resonance type switching power source of claim 1, wherein said PWM circuit comprises an oscillating circuit with a regulation capacitor;

said oscillating circuit producing oscillating wave forms by repeated charge and discharge of said regulation capacitor;

said frequency adjuster varies the oscillating frequency of the PWM circuit by controlling the value of electric current for charge or discharge of the regulation capacitor in response to the output level of said input voltage detector.

3. The resonance type switching power source of claim 2, wherein said PWM circuit comprises a charge circuit for charging said regulation capacitor, a discharge circuit for discharging said regulation capacitor; and a control terminal for determining the oscillation frequency of the PWM circuit;

said charge and discharge circuits controls charging and discharging current by regulating the current value flowing through said control terminal.

4. The resonance type switching power source of claim 1, wherein said frequency adjuster varies the oscillation frequency as a function for input voltage by providing an oscillation circuit of said PWM circuit with command signals.

5. The resonance type switching power source of claim 4, wherein said frequency adjuster produces frequency outputs with hysteresis feature for the input voltage.

6. The resonance type switching power source of claim 1, wherein said frequency adjuster provides an oscillation circuit with command signals to increase the oscillation frequency when the input voltage is equal to or above an input reference voltage and decrease the oscillation frequency when the input voltage is less than the input reference voltage.

7. The resonance type switching power source of claim 6, wherein said frequency adjuster produces frequency outputs with hysteresis feature for the input voltage.

8. The resonance type switching power source of claim 1, wherein said frequency adjuster varies the oscillation frequency in proportion to the input voltage, producing command signals to an oscillation circuit of said PWM circuit.

9. The resonance type switching power source of claim 1, further comprising an output voltage detector connected to said rectifying and smoothing circuit;

wherein said output voltage detector detects output voltage from the secondary winding, compares the output voltage with an output reference voltage, and controls pulse width of drive pulse signals from the control circuit in response to the compared result.

* * * * *